(12) United States Patent
Shibata et al.

(10) Patent No.: US 7,207,207 B2
(45) Date of Patent: Apr. 24, 2007

(54) KNOCK SENSOR

(75) Inventors: Harumasa Shibata, Tokyo (JP); Akito Yokoi, Tokyo (JP); Keizo Miyake, Shizuoka (JP); Hidehiro Inaba, Shizuoka (JP)

(73) Assignees: Mitsubishi Denki Kabushiki Kaisha, Tokyo (JP); Fuji Ceramics Corporation, Shizuoka (JP)

( * ) Notice: Subject to any disclaimer, the term of this patent is extended or adjusted under 35 U.S.C. 154(b) by 0 days.

(21) Appl. No.: 11/302,219

(22) Filed: Dec. 14, 2005

(65) Prior Publication Data

US 2006/0090543 A1 May 4, 2006

Related U.S. Application Data

(62) Division of application No. 10/964,608, filed on Oct. 15, 2004, now Pat. No. 7,007,544.

(30) Foreign Application Priority Data

Apr. 20, 2004 (JP) .......................... P2004-124266

(51) Int. Cl.
*G01L 23/22* (2006.01)
*G01P 15/09* (2006.01)

(52) U.S. Cl. .................... 73/35.11; 311/329; 311/365

(58) Field of Classification Search .................. None
See application file for complete search history.

(56) References Cited

U.S. PATENT DOCUMENTS 4,964,294 A 10/1990 Kawajiri et al.
6,786,078 B2 9/2004 Brammer

FOREIGN PATENT DOCUMENTS

JP 2002-257624 A 9/2002

*Primary Examiner*—Hezron Williams
*Assistant Examiner*—John C Hanley
(74) *Attorney, Agent, or Firm*—Sughrue Mion, PLLC

(57) ABSTRACT

A knock sensor of the invention includes a base having a cylindrical part mounted on a vibration generating part and a flange part, an annular piezoelectric element fitted to the cylindrical part and for converting a knocking vibration of the vibration generating part into an electric signal to detect it, electrodes respectively provided to be in contact with both surfaces of the piezoelectric element, terminal plates disposed to be in contact with the respective electrodes and for extracting an output of the piezoelectric element to outside, and a hold unit for pressure holding the piezoelectric element, the electrodes and the terminal plates to the flange part, in which a conductive adhesive material having an almost equal thickness to the electrode is provided on a portion of the piezoelectric element which is not in contact with the electrode.

4 Claims, 5 Drawing Sheets

KNOCK SENSOR

CROSS REFERENCE

This is a divisional of application Ser. No. 10/964,608 filed Oct. 15, 2004 now U.S. Pat. No. 7,007,544. The entire disclosure of the prior application, application Ser. No. 10/964,608 is considered part of the disclosure of the accompanying divisional application and is hereby incorporated by reference.

BACKGROUND OF THE INVENTION

1. Field of the Invention

The present invention relates to a knock sensor and particularly to a nonresonant knock sensor mounted on, for example, a vibration generating part of an internal combustion engine or the like and for converting a knocking vibration of the internal combustion engine into an electric signal to detect it.

2. Description of the Related Art

A structure of a conventional knock sensor will be described with reference to the drawings. FIG. 8 is a sectional view showing an inner structure of a generally known knock sensor 70. A metal base 21 mounted on a vibration generating part of an internal combustion engine or the like by a bolt or the like is constructed of a cylindrical part 21b in which a bolt through hole 22 is formed and a disk-like flange part 21a formed at its end. A lower insulating sheet 7 is slid onto the cylindrical part 21b to come in contact with the flange part 21a, and the following are successively slid thereon.

That is, a lower terminal plate 5, a piezoelectric element 4 having whole surface electrodes 4a at its upper and lower surfaces, an upper terminal plate 6, an upper side insulating sheet 8, and a weight 9 are slid thereon. Next, a nut 23 is screwed onto a male screw part 21c threaded on the tip end outer peripheral surface of the cylindrical part 21b, and a tool such as a torque wrench is used to tighten the component parts to the flange part 21a at a predetermined torque. Thereafter, a terminal part 14 is bonded to the lower terminal plate 5 and the upper terminal plate 6 by soldering or resistance welding. The base 21 except the inner peripheral surface and both end surfaces of the cylindrical part 21b is coated with a resin mold to form a case 13, and a connector part 15 for extracting a signal is integrally and simultaneously molded to protrude from one side surface of the case 13.

This kind of knock sensor is attached to, for example, an internal combustion engine by a bolt inserted in the through hole 22 provided in the axial direction of the base 21. When a knocking vibration is generated in the internal combustion engine, the component members, such as the piezoelectric element 4 and the weight 9, constituting the knock sensor are vibrated integrally with the knocking vibration, this vibration is converted into a voltage signal by the piezoelectric element 4, and the detection signal is outputted from the terminal part 14 to the outside through the lower terminal plate 5 and the upper terminal plate 6 (see, for example, patent document 1).

[patent document 1] JP-A-2002-257624

The conventional knock sensor is constructed as described above, and since the electrodes 4a of the piezoelectric element 4 are provided on the whole surfaces in contact with the terminal plates 5 and 6, the electrostatic capacity of the piezoelectric element 4 is determined by the thickness of the piezoelectric element and a level corresponding to the area of the whole surface electrode, and the level of the output signal extracted from the knocking vibration is also determined to a predetermined level. In order to change the level of the output signal extracted from the knocking vibration, it is necessary to change the thickness of the piezoelectric element 4 or its diameter. In this case, there also arises a necessity to change the outer shape of the knock sensor.

Thus, there arises a necessity to partially provide electrodes without providing the whole electrodes on the surfaces of the piezoelectric element 4 coming in contact with the terminal plates 5 and 6. However, it has been found that when the piezoelectric element 4 is made to have partial electrodes, since a gap corresponding to the thickness of the partial electrode exists between the piezoelectric element 4 and the terminal plates 5 and 6, there are following problems.

That is, in the piezoelectric element 4, when a polarization processing of the partial electrode part is performed, the polarization action is also exerted on an electrodeless part around the partial electrode. Although electric charges generated by a pyro (pyroelectric) effect caused by environmental temperature change are successively discharged through the terminal plates 5 and 6 at portions where the electrodes exist, they are stored at portions where the electrodes do not exist. The electric charges stored in the electrodeless parts of the piezoelectric element produce an electrical breakdown by a voltage corresponding to the gap existing between the piezoelectric element 4 and the terminal plate 5 or 6, and are instantaneously discharged to the terminal plate 5 or 6.

The electric charges transferred to the terminal plate 5 or 6 by this discharge are applied to the piezoelectric element 4 in the form of a return current. At this time, the electric charge of the same polarity as the electrode polarity of the piezoelectric element 4 is applied, so that the piezoelectric element 4 is instantaneously expanded in the polarization direction, and an electric charge with reverse polarity is generated in the inside. As stated above, in the case where the electrode of the piezoelectric element is made the partial electrode in the structure of the conventional knock sensor, there is a problem that noise is superimposed on the output of the knock sensor.

SUMMARY OF THE INVENTION

The invention has been made to solve the problems as described above, and has an object to provide a knock sensor in which in a case where it is necessary to provide knock sensors having the same outer shape and different output sensitivities, the generation of output noise due to temperature change can be suppressed.

A knock sensor of this invention includes a base having a cylindrical part mounted on a vibration generating part and a flange part provided at a part of the cylindrical part, an annular piezoelectric element fitted to the cylindrical part and for converting a knocking vibration of the vibration generating part into an electric signal to detect it, electrodes respectively provided to be in contact with both surfaces of the piezoelectric element, terminal plates disposed to be in contact with the respective electrodes and for extracting an output of the piezoelectric element to outside, and a hold unit for pressure holding the piezoelectric element, the electrodes and the terminal plates to the flange part, wherein the electrodes are provided to be in partial contact with the piezoelectric element, and an electric insulating material having an almost equal thickness to the electrode is provided on a portion of the piezoelectric element which is not in contact with the electrode.

Since the knock sensor of this invention is constructed as described above, the electrostatic capacity of the piezoelectric element can be changed by changing the area of the partial electrode of the piezoelectric element, and the knock sensors having different output sensitivities can be obtained to have the same outer shape. Further, the knock sensor can prevent discharge to the terminal plate by electric charges generated in the electrodeless part of the piezoelectric element by a pyro effect caused by temperature change, and it becomes possible to obtain such a stable output that noise is not superimposed even when temperature change occurs.

Besides, it becomes possible to adopt a manufacturing method in which the coating of the electric insulating material is reasonably and uniformly applied to the piezoelectric element or the terminal plate.

BRIEF DESCRIPTION OF THE DRAWINGS

FIGS. 2A and 2B show a structure of a piezoelectric element in embodiment 1, in which FIG. 2A is a plan view, and FIG. 2B is a sectional view taken along line E—E.

DETAILED DESCRIPTION OF THE INVENTION

Embodiment 1

Hereinafter, embodiment 1 of this invention will be described with reference to the drawings.

Figure 1:
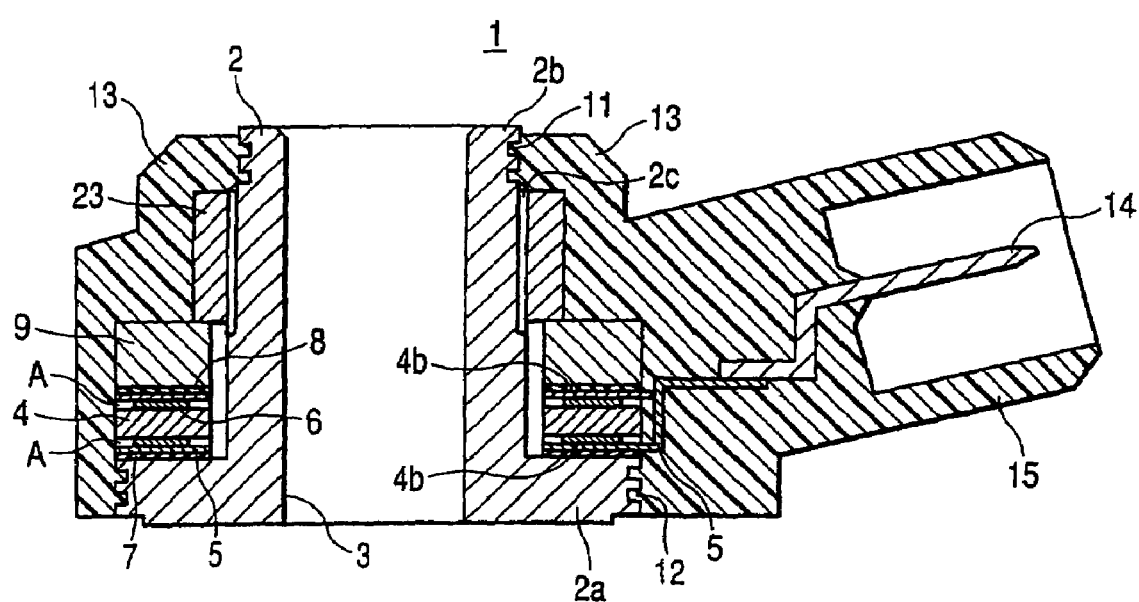
FIG. 1 is a sectional view showing an inner structure of a knock sensor of embodiment 1 of the invention.

FIG. 1 is a sectional view showing an inner structure of a knock sensor of embodiment 1 of this invention.

The knock sensor 1 is constructed such that all component parts are covered with a case 13 made of synthetic resin (for example, nylon 66), and a connector part 15 for connection with a connector from an ignition timing control device (not shown) is formed on the case 13.

Figure 2A:
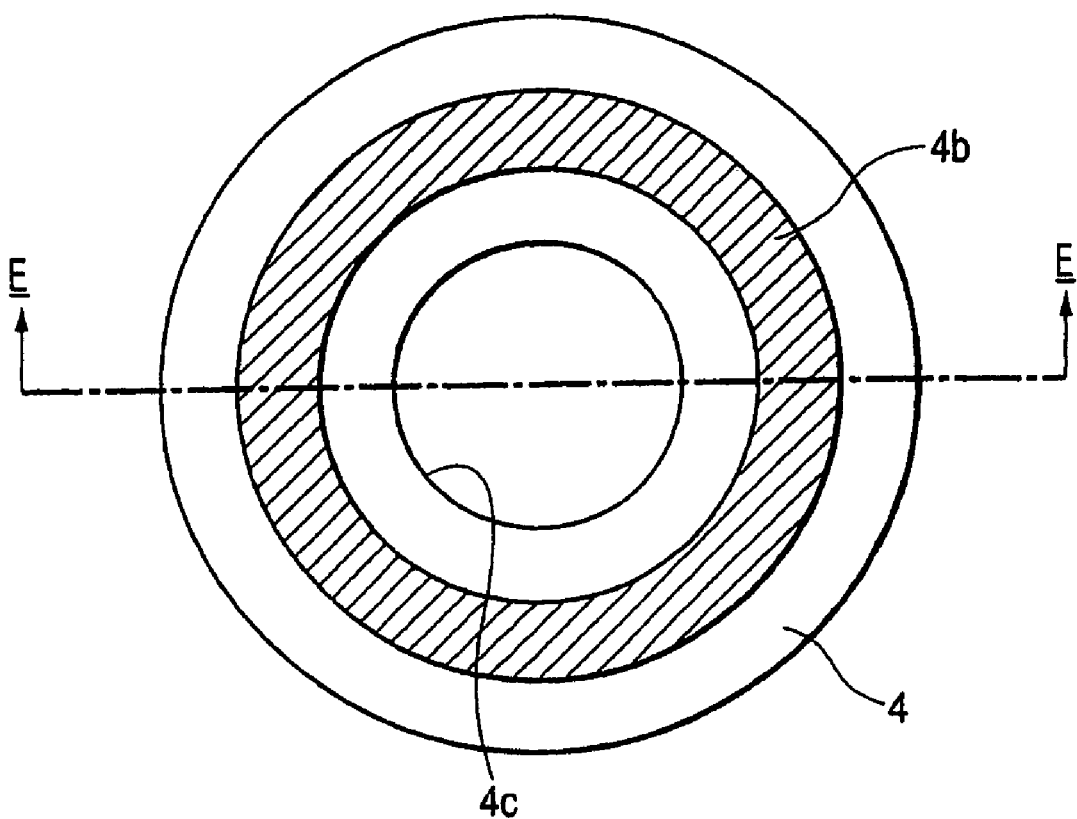
Figure 2B:
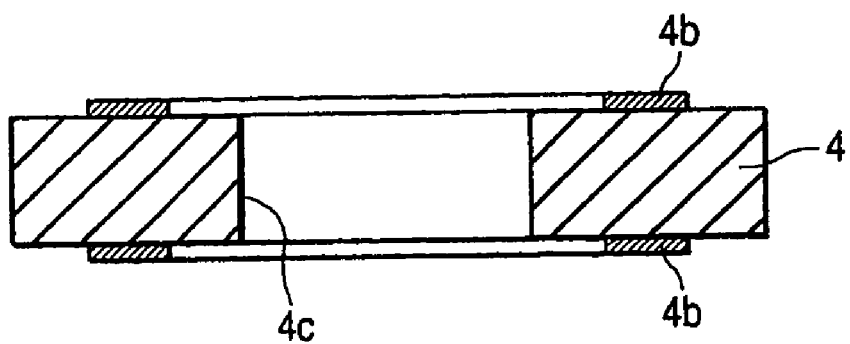

A base 2 is made of metal, and is constructed of a cylindrical part 2b having a through hole 3 and a disk-like flange part 2a provided at its one end. Plural engagement grooves 11 and 12 for ensuring engagement with the case 13 and preventing intrusion of water from the outside are formed on the outer peripheral surface of the flange part 2a and the tip end (upper end in the drawing) outer peripheral surface of the cylindrical part 2b. An annular piezoelectric element 4 is slid onto a portion of the cylindrical part 2b close to the flange part 2a. The detailed structure of the piezoelectric element 4 is shown in a plan view of FIG. 2A and a sectional view of FIG. 2B taken along line E-E.

That is, partial electrodes 4b each having a predetermined thickness (several microns to ten and several microns) are formed on both surfaces of the piezoelectric element 4 which are surfaces coming in contact with terminal plates 5 and 6. A center hole part 4c is slid onto the cylindrical part 2b, and a vibration in an axial direction transmitting through the base 2 is outputted as a voltage signal.

The partial electrode 4b of the piezoelectric element 4 is formed into a shape coming in contact with a part, not the whole surface, of the terminal plate of the piezoelectric element 4, and is subjected to a polarization processing. The piezoelectric element 4 has an electrostatic capacity corresponding to the thickness thereof and the area of the partial electrode 4b, and becomes an element to determine the output sensitivity of the knock sensor 1.

An electric insulating material A is filled in a gap existing between an electrodeless part of the surface of the piezoelectric element 4, that is, a portion where the partial electrode 4b is not provided and the terminal plates 5 and 6 and corresponding to the thickness of the partial electrode 4b of the piezoelectric element 4. As the electric insulating material A, silicone grease or silicone oil is suitable. In order to apply the electric insulating material A to the electrode formation surface of the piezoelectric element 4, there is a method in which the piezoelectric element 4 is rotated under a discharge port of a dispenser for discharging a predetermined material, and a uniform coating is formed on a predetermined coated surface, or a method in which the piezoelectric element 4 is fixed and a dispenser is moved along a predetermined locus to apply a coating.

Further, a method may be adopted in which a predetermined material is made to drop on rotation rollers, and a piezoelectric element 4 is made to pass through between the rotation rollers, so that a coating is applied to upper and lower electrode formation surfaces at the same time.

The lower terminal plate 5 is formed of a conductive metal plate, and in a state where the lower terminal plate is slid onto the cylindrical part 2b of the base 2, it is in contact with the partial electrode 4b from the lower surface of the piezoelectric element 4. The upper terminal plate 6 is also formed of a conductive metal plate, and in a state where the upper terminal plate is slid onto the cylindrical part 2b of the base 2, it comes in contact with the partial electrode 4b from the upper surface of the piezoelectric element 4.

A lower insulating sheet 7 of a thin plate-like insulating resin formed into a ring shape is disposed between the lower terminal plate 5 and the flange part 2a, and insulates the lower terminal plate 5 from the flange part 2a. Similarly, an upper insulating sheet 8 of a thin plate-like insulating resin formed into a ring shape is disposed on the upper surface of the upper terminal plate 6, and insulates the upper terminal plate 6 from an after-mentioned weight 9.

The weight 9 is for giving exciting force to the piezoelectric element 4, is formed into a ring shape, is slid onto the cylindrical part 2b of the base 2, and is provided at the upper side of the upper insulating sheet 8. A nut 23 is screwed on to a male screw part 2c threaded on a tip outer peripheral surface of the tube 2b. The nut tightens the lower insulating sheet 7 slid onto the cylindrical part 2b, the lower terminal plate 5, the piezoelectric element 4, the upper terminal plate 6, the upper insulating sheet 8, and the weight 9 at a predetermined tightening torque, and fixes them in a state where they are pressure held between the nut and the flange part 2a.

As a result, the electric insulating material A applied to the electrode formation surface of the piezoelectric element 4 flows into a gap existing between the electrodeless part of the electrode formation surface of the piezoelectric element 4 and the terminal plates 5 and 6 and corresponding to the thickness of the partial electrode 4b of the piezoelectric element 4, and is filled therein. Thereafter, a terminal part 14 is bonded to the lower terminal plate 5 and the upper terminal plate 6 by soldering or resistance welding, and the base 2 except the inner peripheral surface and both end surfaces of the cylindrical part 2b is coated with a resin mold to form the case 13, while the connector part 15 for extracting a signal is integrally and simultaneously molded to protrude from one side surface of the case 13.

As stated above, in the knock sensor according to embodiment 1, the partial electrode 4b is formed on the electrode formation surface of the piezoelectric element 4, and the electric insulating material A is filled in the gap existing between the electrodeless part and the terminal plates 5 and 6 and corresponding to the thickness of the partial electrode of the piezoelectric element.

By adopting the structure as stated above, it becomes possible to change the electrostatic capacity of the piezoelectric element by changing the electrode area of the partial electrode 4b, and knock sensors having different output sensitivities and the same outer shape can be obtained. Further, it is possible to prevent the electric charge generated in the electrodeless part of the piezoelectric element by the pyro effect caused by temperature change from being discharged to the terminal plate, and the stable output can be obtained in which noise is not superimposed even when temperature change occurs.

Embodiment 2

Next, embodiment 2 of this invention will be described with reference to the drawings.

Figure 3:
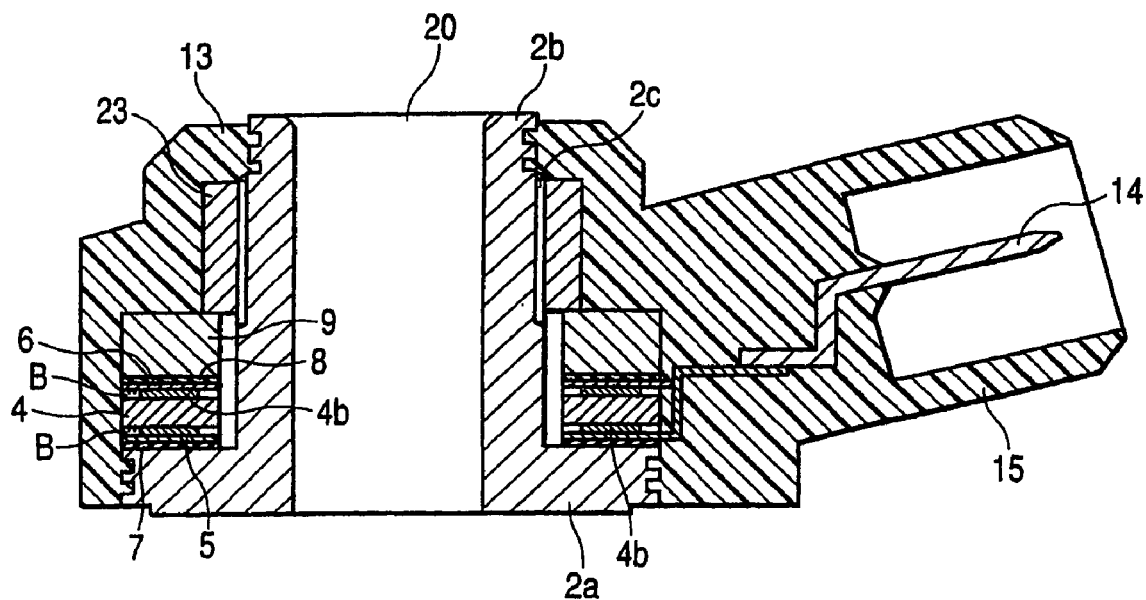
FIG. 3 is a sectional view showing an inner structure of a knock sensor of embodiment 2 of the invention.

FIG. 3 is a sectional view showing an inner structure of a knock sensor 20 of embodiment 2 of the invention.

Although embodiment 2 has the same structure as embodiment 1, a conductive adhesive B is filled in a gap existing between an electrodeless part of an electrode formation surface of a piezoelectric element 4 and terminal plates 5 and 6 and corresponding to the thickness of a partial electrode 4b of the piezoelectric element 4. As the conductive adhesive B, an epoxy adhesive containing conductive metal powder is suitable.

In order to apply the conductive adhesive B to the electrode formation surface of the piezoelectric element 4, there is a method in which the piezoelectric element 4 is rotated under a discharge port of a dispenser for discharging a predetermined material, and a uniform coat is applied to a predetermined coated surface, or a method in which the piezoelectric element 4 is fixed and a dispenser is moved along a predetermined locus to apply a coating.

After the conductive adhesive B is applied to the electrode surface of the piezoelectric element 4, similarly to embodiment 1, the lower insulating sheet 7, the lower terminal plate 5, the piezoelectric element 4, the upper terminal plate 6, the upper insulating sheet 8, and the weight 9 are successively slid onto the cylindrical part 2b of the base in this order from below, and are stacked up on the flange part 2a.

Thereafter, a nut 23 screwed onto a male screw part 2c threaded on a tip outer peripheral surface of the cylindrical part 2b is tightened at a predetermined torque by using a tool such as a torque wrench tightening head, and the above component parts are fixed in a state where they are pressure held between the nut and the flange part 2a. As a result, the conductive adhesive B applied to the electrode formation surface of the piezoelectric element 4 flows into a gap existing between the electrodeless part of the electrode formation surface of the piezoelectric element 4 and the terminal plates 5 and 6 and corresponding to the thickness of the partial electrode 4b of the piezoelectric element 4, and is filled therein.

In this state, heating is performed for several hours in a drying furnace of 100° C. to 120° C., and the conductive adhesive B is dried. Thereafter, a terminal part 14 is bonded to the lower terminal plate 5 and the upper terminal plate 6 by soldering or resistance welding, and the base 2 except the inner peripheral surface and both end surfaces of the cylindrical part 2b is coated with a resin mold to form a case 13, while a connector part 15 for extracting a signal is integrally and simultaneously molded to protrude from one side surface of the case 13.

As stated above, in the knock sensor of embodiment 2, the partial electrode 4b is formed on the electrode formation surface of the piezoelectric element 4, and the conductive adhesive B is filled in the gap existing between the electrodeless part of the electrode formation surface and the terminal plates 5 and 6 and corresponding to the thickness of the partial electrode of the piezoelectric element.

By adopting the structure as stated above, the electrostatic capacity of the piezoelectric element can be changed by changing the electrode area of the partial electrode 4b, and knock sensors having different output sensitivities and the same outer shape can be obtained. Further, the electric charge generated in the electrodeless part of the piezoelectric element by the pyro effect caused by temperature change is transferred to the terminal plate through the conductive adhesive B at any time, and discharge does not occur between the electrodeless part of the piezoelectric element and the terminal plate. Thus, even when temperature change occurs, noise is not superimposed, and stable output can be obtained. Besides, it is possible to adopt a manufacturing method in which application of the conductive adhesive B to the piezoelectric element is reasonably and uniformly performed.

Embodiment 3

Figure 4:
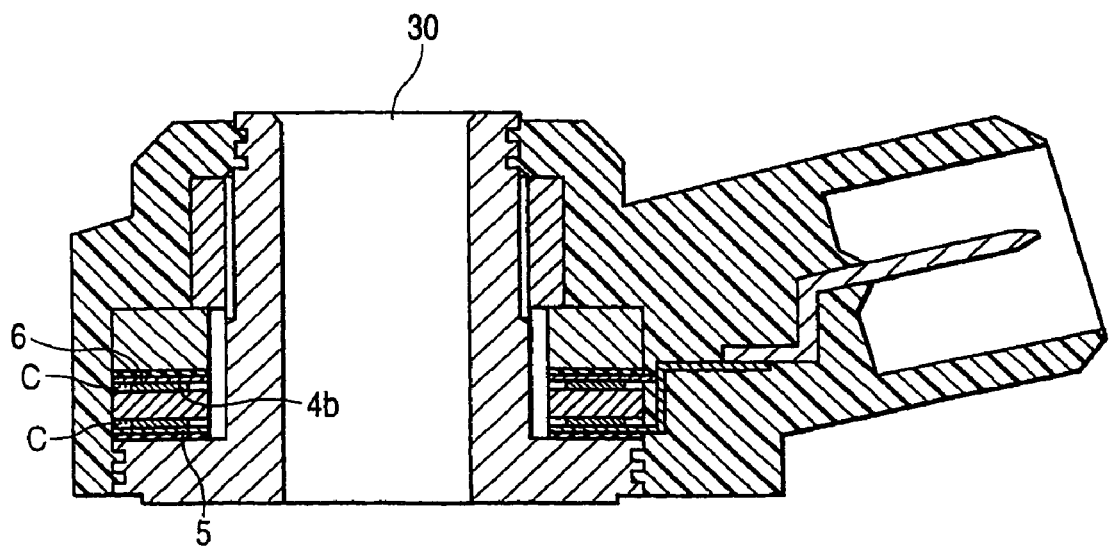
FIG. 4 is a sectional view showing an inner structure of a knock sensor of embodiment 3 of the invention.

Next, embodiment 3 of this invention will be described with reference to the drawings. FIG. 4 is a sectional view showing a structure of embodiment 3. In a knock sensor of embodiment 3, a gap existing between an electrodeless part of an electrode formation surface of a piezoelectric element 4 and terminal plates 5 and 6 and corresponding to the thickness of a partial electrode 4b of the piezoelectric element 4 is filled with an electric insulating material C containing a filler having a particle size smaller than the gap. Since the other structure is the same as embodiment 1, its description will be omitted. As a manufacturing method, manufacture can be made by the same manufacturing method as embodiment 1. However, since the filler in the electric insulating material C is dispersed without being collapsed in the gap, the material can be filled in the gap without damaging the physical properties of the electric insulating material C.

Embodiment 4

Next, embodiment 4 of this invention will be described with reference to the drawings.

Figure 5:
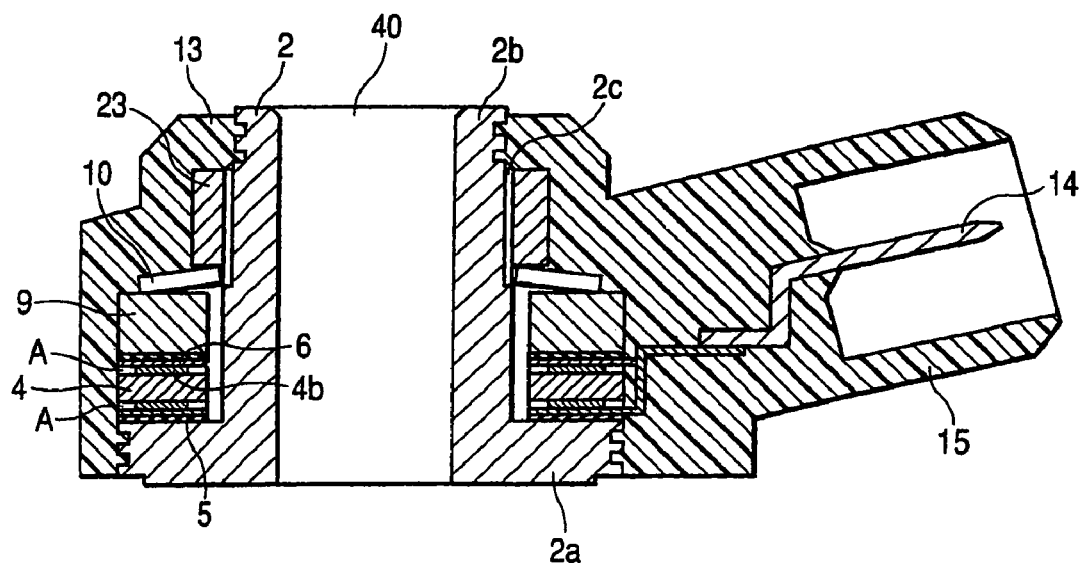
FIG. 5 is a sectional view showing an inner structure of a knock sensor of embodiment 4 of the invention.

FIG. 5 is a sectional view showing an inner structure of a knock sensor 40 of embodiment 4 of the invention.

Although the knock sensor of embodiment 4 is almost similar to the knock sensor of embodiment 1, a spring 10 is slid onto a cylindrical part 2b of a base 2 so that it is positioned on a weight 9.

Since a lower insulating sheet 7 slid onto the cylindrical part 2b, a lower terminal plate 5, a piezoelectric element 4, an upper terminal plate 6, an upper insulating sheet 8, and a weight 9 are pressure held between the nut 23 and a flange part 2a through the spring 10, they can be firmly tightened and fixed.

Thereafter, a terminal part 14 is bonded to the lower terminal plate 5 and the upper terminal plate 6 by soldering or resistance welding, and the base 2 except the inner peripheral surface and both end surfaces of the cylindrical part 2b is coated with a resin mold to form a case 13. Further, a connector part 15 for extracting a signal is integrally and simultaneously molded to protrude from one side surface of the case 13.

Although FIG. 5 shows the example in which the electric insulating material A is filled in the gap corresponding to the thickness of the partial electrode 4b of the piezoelectric element 4, the conductive adhesive B may be filled therein instead of the electric insulating material A, and similar effects can be expected.

Embodiment 5

Next, embodiment 5 of the invention will be described with reference to the drawings.

Figure 6:
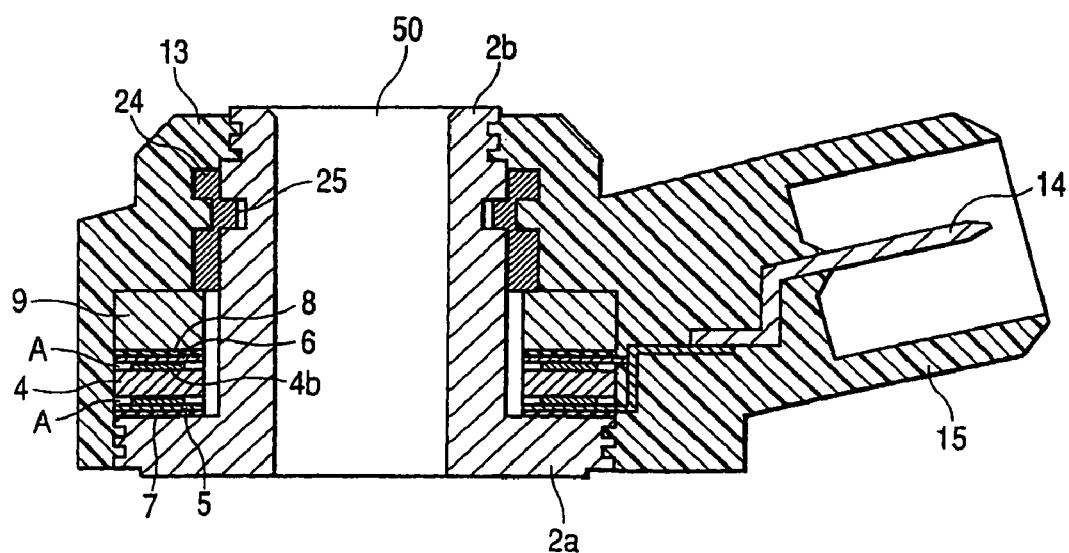
FIG. 6 is a sectional view showing an inner structure of a knock sensor of embodiment 5 of the invention.

FIG. 6 is a sectional view showing an inner structure of a knock sensor 50 of embodiment 5 of the invention.

Although the knock sensor of embodiment 5 is almost equal to the knock sensor of embodiment 1, instead of the nut 23, a stopper ring 24 is slid onto a cylindrical part 2b of a base 2 and is caulked into a groove 25 of the cylindrical part 2b in a state where a weight 9 slid onto the cylindrical part 2b, an upper insulating sheet 8, an upper terminal plate 6, a piezoelectric element 4, a lower terminal plate 5, and a lower insulating sheet 7 are pressure held between the stopper ring and a flange part 2a of the base 2.

Thereafter, a terminal part 14 is bonded to the lower terminal plate 5 and the upper terminal plate 6 by soldering or resistance welding, and the base 2 except the inner peripheral surface and both end surfaces of the cylindrical part 2b is coated with a resin mold to form a case 13, while a connector part 15 for extracting a signal is integrally and simultaneously molded to protrude from one side surface of the case 13.

Although FIG. 6 shows the example in which the electric insulating material A is filled in the gap corresponding to the thickness of the partial electrode of the piezoelectric element 4, the conductive adhesive B may be filled therein instead of the electric insulating material A, and similar effects can be expected.

Embodiment 6

Next, embodiment 6 of this invention will be described.

Figure 7:
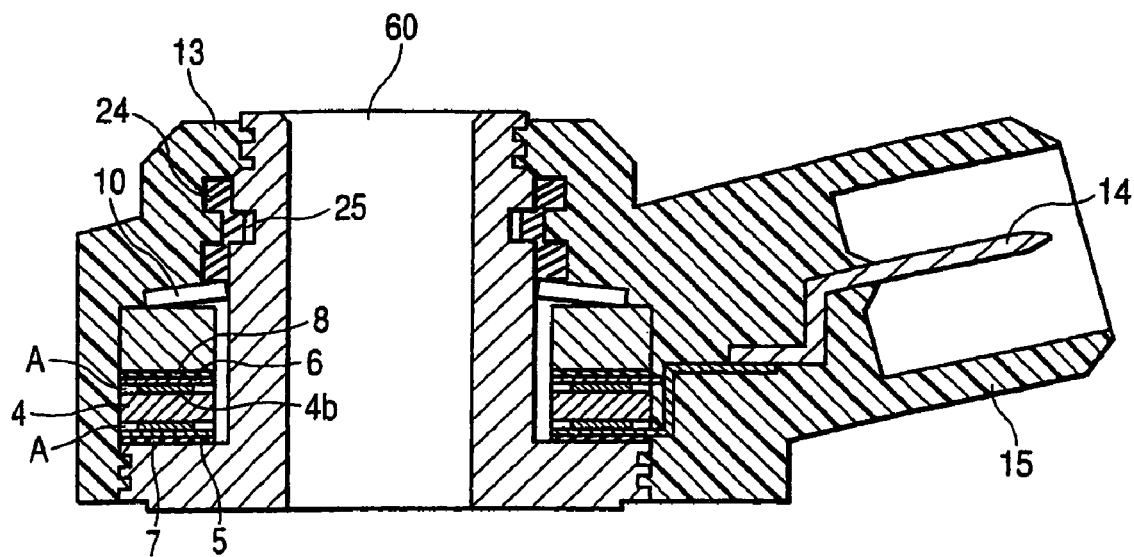
FIG. 7 is a sectional view showing an inner structure of a knock sensor of embodiment 6 of this invention.
Figure 8:
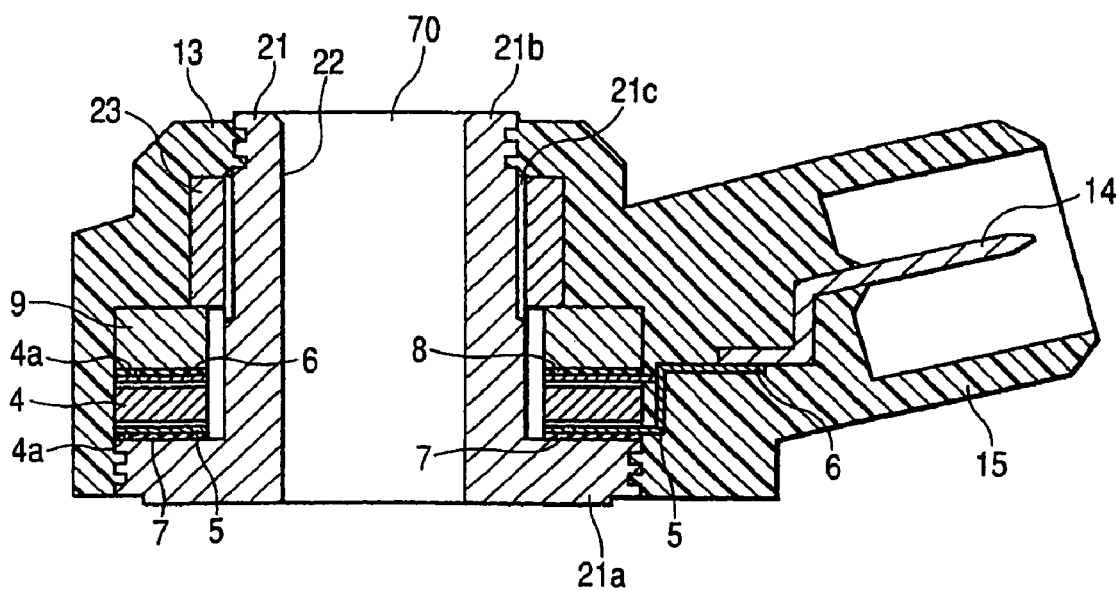
FIG. 8 is a sectional view showing a structure of a conventional knock sensor.

FIG. 7 is a sectional view showing an inner structure of a knock sensor 60 of embodiment 6 of this invention.

Although the knock sensor of embodiment 6 is almost equal to the knock sensor of embodiment 5, a spring 10 of a coned disc spring is slid onto a cylindrical part 2b between a caulked stopper ring 24 and a weight 9. The weight 9, an upper insulating sheet 8, an upper terminal plate 6, a piezoelectric element 4, a lower terminal plate 5, and a lower insulating sheet 7 are pressure held between the stopper ring and a flange part 2a of the base through the coned disc spring 10.

Thereafter, a terminal part 14 is bonded to the lower terminal plate 5 and the upper terminal plate 6 by soldering or resistance welding, and the base 2 except the inner peripheral surface and both end surfaces of the cylindrical part 2b is coated with a resin mold to form a case 13, while a connector part 15 for extracting a signal is integrally and simultaneously molded to protrude from one side surface of the case 13.

Although FIG. 7 shows the example in which the electric insulating material A is filled in the gap corresponding to the thickness of the partial electrode of the piezoelectric element 4, the conductive adhesive B may be filled therein instead of the electric insulating material A, and similar effects can be expected.

What is claimed is:

1. A knock sensor comprising:
   a base including a cylindrical part to be mounted on a vibration generating part, and a flange part provided at a part of the cylindrical part;
   an annular piezoelectric element fitted to the cylindrical part which converts a knocking vibration of the vibration generating part into an electric signal to detect the knocking vibration, said piezoelectric element having a pair of axial end surfaces;
   annular electrodes respectively provided to be in contact with both of said surfaces of the piezoelectric element, each of said annular electrodes covering less than the entire respective surfaces of the piezoelectric element;
   terminal plates disposed to be in contact with the respective electrodes and which extract an output of the piezoelectric element to outside the knock sensor; and
   a hold unit which holds the piezoelectric element, the electrodes and the terminal plates to the flange part, and
   a conductive adhesive having an almost equal thickness to the electrodes provided on a respective portion of each of the piezoelectric element surfaces which is not in contact with the electrodes.

2. A knock sensor according to claim 1, wherein the hold unit presses the piezoelectric element, the electrodes and the terminal plates to the flange part through a weight provided between the hold unit and the terminal plate, and an annular spring disposed on the weight.

3. A knock sensor according to claim 1, wherein the hold unit is caulked to the cylindrical part.

4. A knock sensor according to claim 1, wherein the hold unit presses the piezoelectric element, the electrodes and the terminal plates to the flange part through a weight provided between the hold unit and the terminal plate, and an annular spring disposed on the weight, and the hold unit is caulked to the cylindrical part.

* * * * *